United States Patent [19]

Togashi et al.

[11] 4,345,248

[45] Aug. 17, 1982

[54] LIQUID CRYSTAL DISPLAY DEVICE WITH WRITE-IN CAPABILITY

[75] Inventors: Seigo Togashi; Akira Tsuzuki, both of Tokorozawa, Japan

[73] Assignee: Citizen Watch Company Limited, Tokyo, Japan

[21] Appl. No.: 215,900

[22] Filed: Dec. 12, 1980

[30] Foreign Application Priority Data

Dec. 14, 1979 [JP] Japan ................................ 54-162996

[51] Int. Cl.$^3$ ............................................... G06F 3/02
[52] U.S. Cl. .................................... 340/784; 340/707; 340/765
[58] Field of Search ............... 340/705, 706, 707, 758, 340/765, 771, 784

[56] References Cited

U.S. PATENT DOCUMENTS 4,104,617 8/1978 Bean et al. ........................... 340/707
4,177,354 12/1979 Mathews ............................. 340/707

*Primary Examiner*—Alvin H. Waring
*Attorney, Agent, or Firm*—Jordan and Hamburg

[57] ABSTRACT

A novel type of liquid crystal display device is disclosed, whereby data can be written in, via the display device, by utilizing light-generating means such as a light pen. The display device is of matrix configuration, with a switching element being provided individually for each of the elements of the display matrix, and is characterized by a photoelectric element being provided for each display element, whereby data is written in. The discrimination circuit means whereby the statuses of the photoelectric elements are sensed, in a time sharing manner, can utilize the same row and column electrodes used to drive the switching elements of the display matrix, and the photoelectric elements can be formed during the same process, and upon the same substrate, as the switching elements.

15 Claims, 23 Drawing Figures

LIQUID CRYSTAL DISPLAY DEVICE WITH WRITE-IN CAPABILITY

BACKGROUND OF THE INVENTION

As a result of recent advances in electronic technology, it has become possible to produce very compact devices which can perform high-speed data processing and which can moreover handle relatively large amounts of data. Such devices include electronic calculators, certain types of electronic timepiece, etc. However, until now, there has been no compact and easily produced device whereby data can be input as well as output from such types of data processing equipment. Various types of device can provide what is sometimes referred to as "hard copy" output from data processing equipment, e.g. printers and plotters. Temporary data output, i.e. "soft-copy" output can be provided by such devices as CRTs and by electro-optical display devices such as liquid crystal displays. It would be highly desirable, however, to provides some means whereby data could be written into data processing equipment such as an electronic calculator, with the write-in means being of suitably compact dimensions, i.e. of the order of dimensions which can be achieved for read-out purposes by using electro-optical display means. This would enable conversational interaction between the user and the compact data-processing device, in a similar manner to that which is possible with a computer and a CRT monitor provided with light-pen input means. Use of a CRT as a write-in device for a portable electronic device is however impractical, due to the high voltages which are required for the CRT operation, and the high level of power consumption. From the point of view of low power consumption and low levels of operating voltage, liquid crystal display devices are ideal. Liquid crystal displays of matrix type have been developed wherein data can be displayed with a very high degree of display density. Liquid crystal displays also have the advantage of being simple and economical to manufacture on a large scale production basis, and can be made extremely compact. Thus, in almost every respect, they are ideally suited for use in portable devices. In particular, a type of liquid crystal matrix display has been developed in which an individual switching element is provided to control each element of the display. Such a liquid crystal display has a performance which is comparable to that of a CRT, for certain applications.

The problem of inputting data to a portable data processing device however has proved more difficult to overcome. In devices such as calculators or timepieces, data input is generally performed by actuation of a plurality of keys coupled to switches. However, due to the small size of such portable devices, the volume which is available to provide such switches is very limited. In addition, if the keys are of small size, their operation may be difficult and inconvenient. There is therefore a requirement for some means of data input to a portable electronic device which would eliminate the need for key switches, yet which would be simple to use and could be economically combined with the overall system of the portable electronic device. Such a data input means is revealed by the present invention, which enables a liquid crystal display panel to be produced whereby data, including numerals, characters, diagrams etc, can be written into a data processing device by suitable application of a light source (such as a light pen) to the display panel. The display panel can be manufactured in a very similar way to that of a liquid crystal display panel of the prior art, in which a switching element is built-into the display panel for each of the display elements, and the elements whereby the light data input is sensed can be formed by the same manufacturing process, and during the same processing steps, by which the switching elements are formed. A display panel according to the present invention can therefore be produced virtually as economically as can a liquid crystal display panel of the built-in switching element type which does not possess a data write-in function.

SUMMARY OF THE INVENTION

The present invention is directed toward a liquid crystal display panel, of matrix configuration, whereby data can be written in, via the display panel, to data processing circuitry connected to the display panel. In particular, the present invention is directed toward a novel type of liquid crystal display panel which can be simply and economically manufactured.

A liquid crystal display panel according to the present invention is basically a type of display panel in which a matrix of liquid crystal display elements is defined by a plurality of display electrodes, which are selectively addressed in a time-sharing manner, and in which an individual switching element is "built-into" the display panel for each of the display elements. The advantages of this "built-in switching element" method of construction are well known, and include a virtual freedom from any cross-talk effects between the various electrodes and conductors. The signals applied to the various display elements are applied over two sets of electrodes, arranged perpendicular to one another, which shall be referred to herein as the row and column electrodes. The row electrodes are sequentially addressed, one at a time, to thereby sequentially render the switching elements of each row conductive. The potential levels applied to the column conductors are thereby applied through the switching elements to the display electrodes, as each row of display elements is selected, and are held constant on the display electrodes, in the intervals between successive scans, by the capacitance of the display elements. In this way, new data can be written into the display, or data can be constantly displayed.

The basic feature of a display panel according to the present invention is that a photoelectric element is provided at each intersection of the row and column electrodes of the display panel, i.e. at each of the display elements, and that means are provided whereby these photoelectric elements are sequentially scanned to detect whether a signal has been applied to the photoelectric elements by illuminating the photoelectric elements from a light source, such as a light pen. One important advantage of a display panel according to the present invention is that the same row and column electrodes which are used for selecting and inputting data to the display electrodes, to provide display data, can also be used to scan the photoelectric elements and to detect the status of each photoelectric element. A second important advantage of a display panel according to the present invention is that the photoelectric elements can be manufactured during the same processing steps whereby the switching elements are formed, using the same materials and techniques as are used in forming the switching elements. It can therefore be appreciated that the manufacture of a liquid crystal display panel according to the present invention involves very little more complication or expense than the manufacture of a liquid crystal display panel of the built-in switching element type which is not provided with an array of photoelectric elements.

DESCRIPTION OF THE PREFERRED EMBODIMENTS

Figure 1:
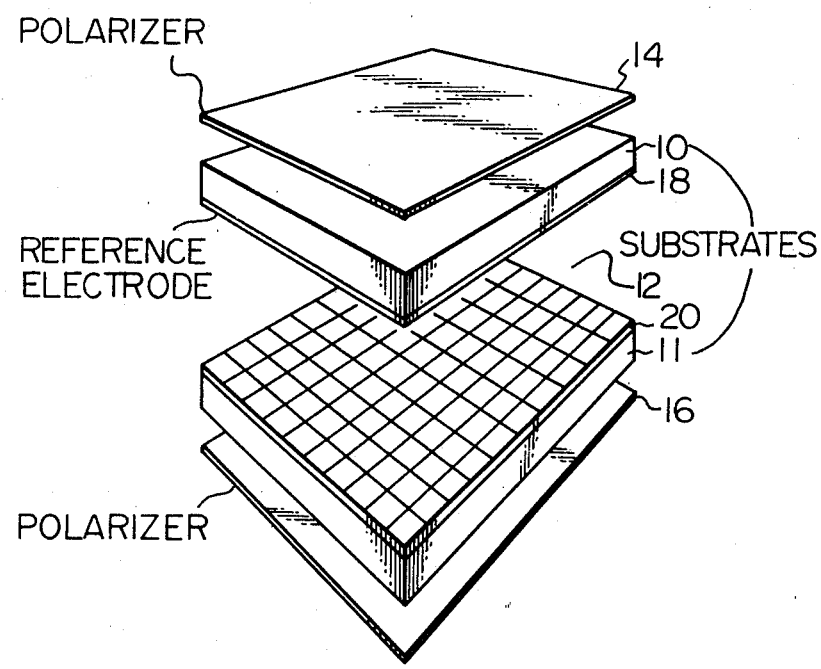
FIG. 1 is a diagram to illustrate the general configuration of a liquid crystal display cell according to the present invention.

The present invention is directed toward a liquid crystal display panel having a matrix of photoelectric elements arranged with respect to the display elements such that data can be written into data processing circuitry through the display panel, by utilizing a light source such as a light pen. Since there have been proposals in the prior art to construct liquid crystal display devices having the functions provided by a display panel according to the present invention, a description of the various disadvantages of such prior art display panels will be given before discussing the present invention in detail with respect to specific embodiments. With such prior art types of liquid crystal display panel which are intended to provide a data write-in capability, an array of photoelectric elements is provided external to the actual liquid crystal display panel structure. Generally, the photoelectric elements are mounted on the opposite side of the display panel to the source of light which illuminates the panel, i.e. in the case of a display cell which employs polarizing plates, the photoelectric elements would be mounted behind the rear polarizing plate. With such an arrangement, if some elements of the display panel are driven into the non-transparent state, then almost no light will be able to reach the photoelectric elements through the display panel, when it is desired to input data by selectively illuminating the photoelectric elements by means such as a light pen. Thus it does not appear that in practice such a display panel could be used to input data while a pattern is being displayed. Thus, the major advantages obtainable from the use of a light pen for data input, (i.e. the capabilities for selective erasure of displayed data, or for inputting data as designated by information appearing on the display) cannot be provided by such a type of prior art liquid crystal display panel. Another point to be considered is that it is very desirable to be able to make the operation of the display functions of the display panel completely independent of the write-in function. However, it is extremely difficult to establish such independence between the write-in and the display functions, with such a prior art type of liquid crystal display panel. Another problem which arises with such prior art liquid crystal panels is that, even when the liquid crystal layer is in the transparent state, the efficiency of utilization of light applied to the panel for the purpose of exciting the photoelectric elements is very low. This is because such light must pass through the display panel substrates and the liquid crystal layer, as well as, in most cases, polarizing plates and perhaps also a reflector plate.

A considerable amount of light is thereby absorbed before actually reaching the photoelectric elements. It has thus been found necessary to use photoelectric elements having a very high sensitivity to incident light, in such prior art types of liquid crystal display cell. Another problem which arises with such prior art types of display panel lies in the fact that it is extremely difficult to align the photoelectric elements with the display elements, during the process of manufacture of the display panel. To provide an effective display capability, it is desirable to make the density of display elements as high as possible. Some examples of prior art liquid crystal display panels, which are of the built-in switching element type, have a density of display elements of from 10 to 30 elements per square mm. It can be appreciated that with such high densities of display elements, the problems of aligning the display elements with a corresponding array of photoelectric elements are extremely serious, and will present severe manufacturing problems.

Yet another problem which arises with such prior art types of liquid crystal display panels is that of providing interconnections between the elements of the display panel and the peripheral circuitry which applies drive signals to the elements. Since the photoelectric elements are provided external to the liquid crystal display panel itself, it will obviously be necessary to provide a completely separate set of connecting leads between the peripheral circuitry and the photoelectric elements, and in practice the number of these leads can be very large. For example, in the case of a display matrix having 100 rows and 100 columns, i.e. having 1000 display elements and 1000 optoelectric elements, a total of 400 interconnecting leads will be required between the peripheral circuitry and the elements of the panel. The provision of such large numbers of interconnecting leads will result in considerable manufacturing difficulties. In the case of a liquid crystal display panel which does not have a write-in capability, it is possible to reduce the number of interconnecting leads by forming at least a part of the peripheral circuitry directly upon the same substrate of the display panel as the switching elements and other electrodes. However, if an array of photoelectric elements is provided external to the panel, the problem of a large number of interconnecting leads will still remain.

A further problem which arises with such a prior art type of liquid crystal display panel is that, since the photoelectric element array is separate from the actual liquid crystal panel, the thickness of the device overall is inevitably increased. However, the market appeal of portable electronic devices such as electronic calculators or electronic timepieces is strongly affected by the thickness of the device, since there is an increasing trend toward making such devices as thin as possible.

With a liquid crystal display panel according to the present invention, the various problems which arise with prior art display panels are effectively eliminated. With the present invention, a liquid crystal display panel having a matrix of display elements, with a switching element provided to control the application of signals to each individual display element is further provided with an photoelectric element for each of the display elements, formed upon the same substrate as the display element and adjacent thereto. With such an arrangement, it can be understood that the problems of absorption of light by excited regions of the liquid crystal or by passage through all of the substrate and polarizing plate layers can be substantially reduced. The problem of alignment of the photoelectric elements and the display elements is completely eliminated, since the various electrode films and semiconductor regions constituting these elements can be formed simultaneously during the same manufacturing process, by well-known techniques such as photo-etching and evaporative deposition. The problem of a large number of interconnecting leads is also substantially resolved, since it becomes possible to use the same interconnecting leads both to input data to be displayed by the display elements and to scan the photoelectric elements to detect input of any signals thereto by means of a light pen, etc. Such common use of the interconnecting leads can be accomplished by means of time-sharing signal switching techniques. In addition, of course, the thickness of the display panel overall is not increased as a result of the incorporation of the photoelectric elements, so that the last of the problems related above is also overcome. However, perhaps the greates advantage conferred by the method of the present invention for producing a liquid crystal display panel having a write-in capability is that of ease of manufacture, since the photoelectric elements can be formed of the same types of semiconductor materials as the switching elements, during precisely the same manufacturing steps, and upon the same substrate which supports the switching elements and various other electrodes and connecting leads. It should be noted that, since the absorption of light before reaching the photoelectric elements is much less for a display panel according to the present invention than in the case of a prior art type of display panel having the photoelectric elements provided externally, it is not necessary to utilize photoelectric elements which have a very high sensitivity to light. Thus, with the method of the present invention it becomes possible to utilize simple p-n junctions, or pairs of p-n junctions connected back-to-back, for each photoelectric element, thereby further simplifying the basic structure of a display panel according to the present invention.

Referring now to FIG. 1, a diagram is shown therein to illustrate the general configuration of an embodiment of a liquid crystal display panel according to the present invention. Reference numerals 10 and 11 denote a pair of substrates, between which are enclosed a layer of liquid crystal, which is aligned for the twisted nematic mode of operation, and is designated by numeral 12. Polarizing plates 16 and 14 are provided adjacent to the outer faces of substrates 10 and 11. Numeral 18 denotes a reference electrode film, which covers the interior face of substrate 10, while numeral 20 denotes a layer which comprises a matrix array of switching elements, photoelectric elements and various interconnecting electrodes as explained hereinafter.

Figure 2:
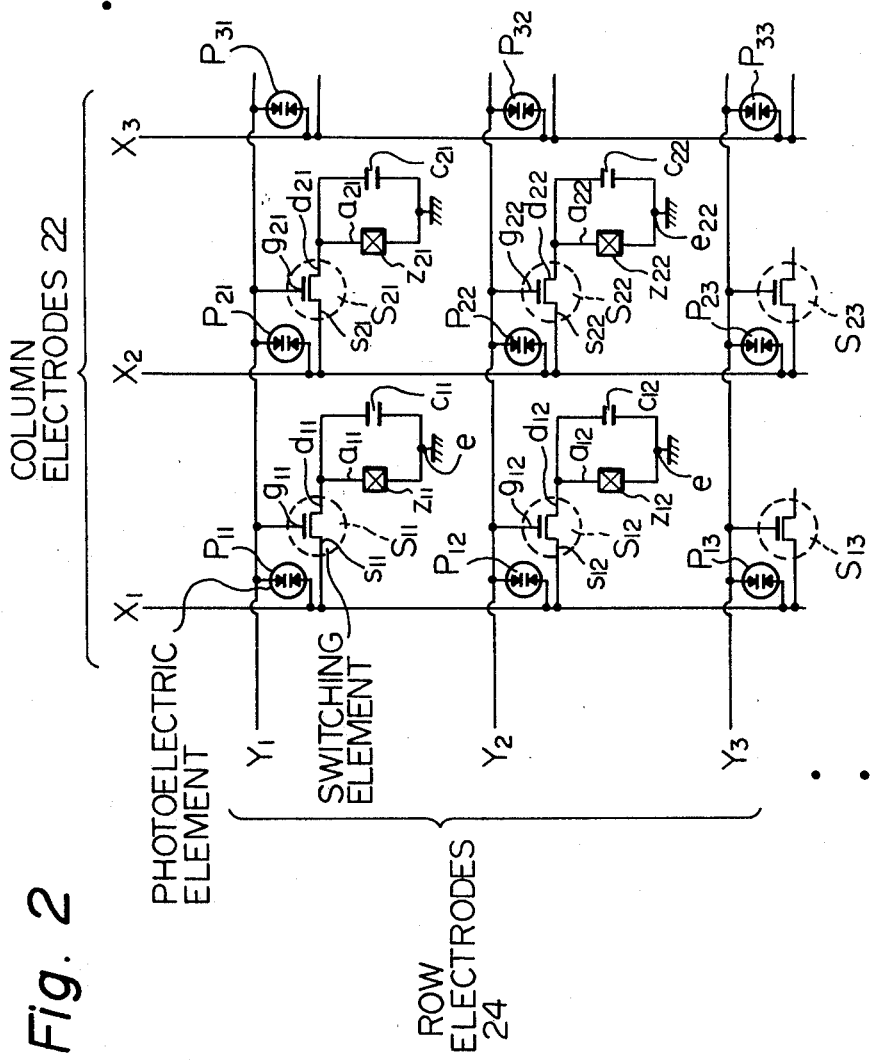
FIG. 2 is an equivalent circuit diagram of the various elements upon a display panel embodiment according to the present invention.

Referring now to FIG. 2, an equivalent circuit diagram of a portion of the elements and electrodes comprising layer 20 of FIG. 1 is shown. Numeral 22 denotes a set of column electrodes $X_i$ (where $i=1 \ldots n$) whereby data signals are input from a data processing circuit, and further whereby data is read out to indicate light signal inputs to the photoelectric elements. Numeral 24 denotes a set of row electrodes $Y_j$ ($Y_1, Y_2 \ldots Y_m$), whereby rows of elements are consecutively addressed, on a one-at-a-time basis, to provide time-sharing operation in conjunction with synchronized switching of the data signals applied to column electrodes 22. A display element is provided adjacent to each intersection of the row and column electrodes 22 and 24. Each display element comprises a small region of conductive film, referred to hereinafter as a display electrode, and a corresponding region of the liquid crystal layer 12 which is enclosed between the display electrode and the reference electrode film 18. In FIG. 2, the impedance of each display element is denoted as $a_{ij}$ ($i=1 \ldots n, j=1 \ldots m$). Additional capacitance, which may be added to each display element if necessary, is denoted as $C_{ij}$ ($i=1 \ldots n, j=1 \ldots m$) Connection between the display electrodes and the row electrodes 22 is controlled by an array of switching elements, $S_{ij}$ ($i=1 \ldots n, j=1 \ldots m$), with a switching element being connected between each display electrode and a corresponding column electrode. In this embodiment, the switching elements comprise thin-film field-effect transistors, whose gate electrodes (designated as $g_{ij}$) are controlled by scanning signals applied to the row electrodes 24, i.e. rows of switching elements are sequentially set into the conducting condition (between drain and source electrodes $s_{ij}$ and $d_{ij}$) in response to scanning signals applied to the row electrodes 24. In addition to these switching elements, a photoelectric element (denoted as $P_{ij}$) is provided at each intersection of the row and column electrodes. In this embodiment, a photoelectric element is connected directly between the row and column electrode at each intersection, and is made conducting in response to light applied thereto from an external source such as a light pen. The reference electrode 18 shown in FIG. 1 is denoted by the letter e.

It is an important feature of this embodiment of the present invention that the row and column electrodes 22 and 24 are utilized both to apply display data signals to the display electrodes, to thereby provide a visual display by means of the display elements, but are also used to output data indicative of changes in the characteristics of the photoelectric elements $P_{ij}$, when such changes occur in response to input light signals. Such an arrangement not only provides the advantage of simplification of manufacture, by reducing the number of connecting leads between the peripheral circuitry and the display panel, but also means that at least a portion of the peripheral circuitry can be used in common both for display readout purposes and also for photoelectric element status detection purposes. The amount of peripheral circuitry, and the power consumed by this circuitry can thereby be comparable to that of a display panel which is only provided with a display readout capability.

Figure 3:
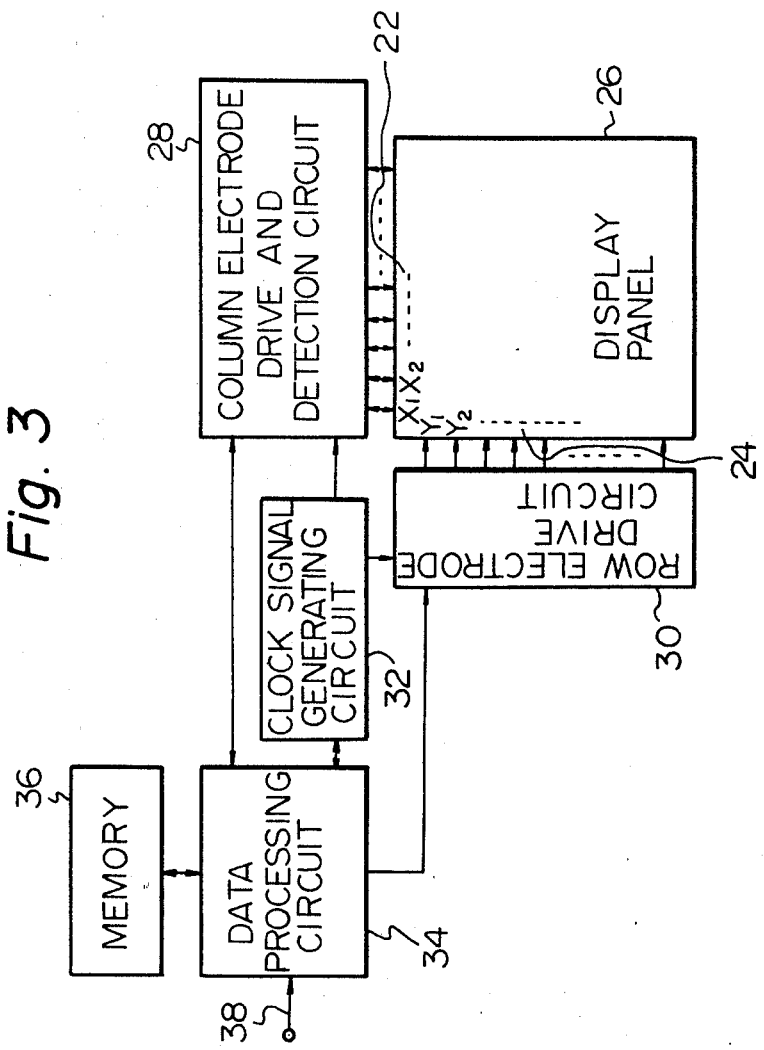
FIG. 3 is an overall block diagram of an example of a display system containing a display panel according to the present invention.

An example of the peripheral circuitry for the embodiment of FIGS. 1 and 2 is shown in general block diagram form in FIG. 3. Here, the display panel itself, i.e. the components shown in FIG. 1, is denoted by numeral 26. The switching signals whereby the row electrodes 24 are successively addressed are produced by a row electrode drive circuit 30. Numeral 28 denotes a column electrode drive and detection circuit, which serves to apply display data signals to the column electrodes 22 and also to detect changes in the characteristics of the photoelectric elements caused by application of light. Numeral 32 denotes a clock signal generating circuit, which serves to generate clock signals to control the timing of operation of the column electrode drive and detection circuit 28 and the row electrode drive circuit 30. Numeral 34 denotes a data processing circuit, which serves to produce display data to be sent to column electrode drive and detection circuit 28, together with various mode switching signals etc, which control changeover between a display mode and a light detection mode as described hereinafter. Data processing circuit 34 also sends mode switching signals to the row electrode drive circuit 30, and receives light detection signals sent from column electrode drive and detection circuit 28 when operation is in the light detection mode. Numeral 36 denotes a memory section, which serves to store various diagrams, characters etc which are input through the light detection function, as well as other data which may be input through external data input means designated by numeral 38. Stored data can be output from memory 36, when necessary, to data processing circuit 34.

Figure 4:
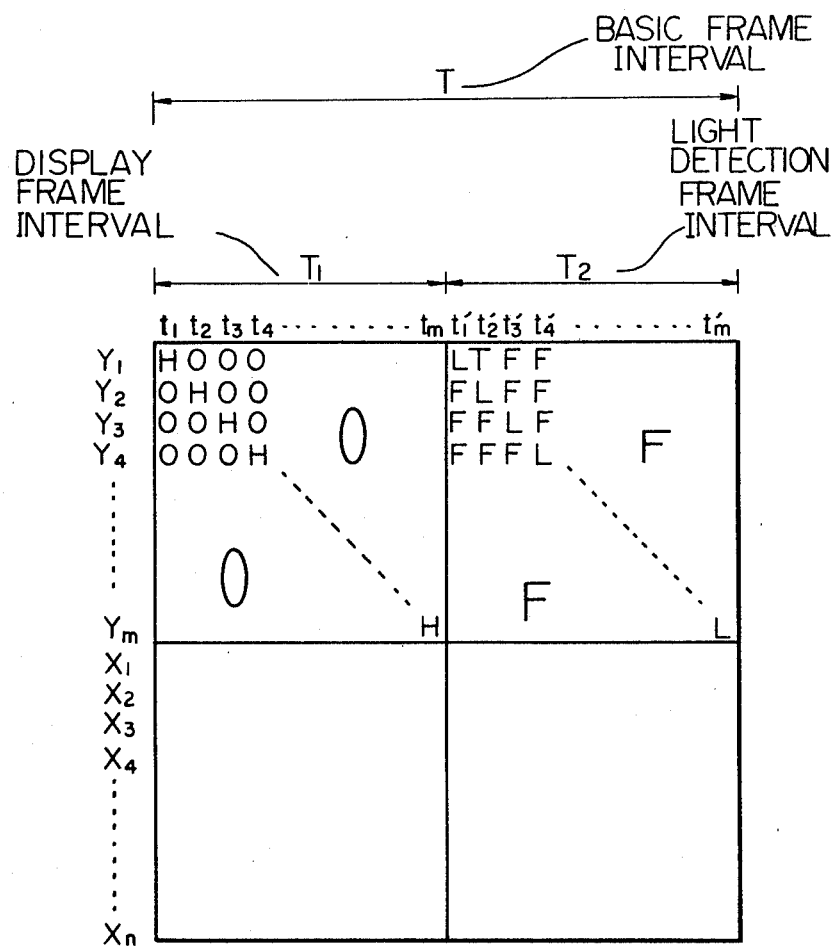
FIG. 4 is a diagram to assist in understanding the method of applying drive signals to a display panel according to the present invention.

FIG. 4 is a diagram to assist in understanding the basic principles of applying drive signals to the row and column electrodes 22 and 24 of the embodiment shown in FIGS. 1 to 3, whereby display readout, together with input of data by means of a light pen or other light generating means, can be performed simultaneously. Driving of the row and column electrodes is performed cyclically, on a time-sharing basis, during a basic frame period denoted as T. This basic frame period is divided into a display frame period $T_1$ and a light detection frame period $T_2$. During the display frame $T_1$, the row electrodes 24 are successively selected by the row scanning signals from drive circuit 30, during each of a succession of frame sub-intervals $t_1, t_2, \ldots t_m$. In FIG. 4, the letter H indicates that a potential which is sufficient to cause conduction of a switching element is applied to the gate electrodes of switching elements in a selected row, while the letter O indicates that a potential which is insufficient to cause conduction of a switching element is applied to the gate electrodes of switching elements of a non-selected row. Thus, as shown, a single row of switching element is selected to be rendered conductive during each of the sub-frame intervals $t_1, \ldots t_m$, by an H level potential being applied to the row electrode of that row of switching elements. During the sub-interval in which a particular row of switching elements is selected, the display data which is to be applied to the display electrodes of that row is input to the column electrodes $X_1 \ldots X_n$. Because of isolation provided by the switching elements, data signals which are applied to the display electrodes during a selection sub-interval are held stored by the capacitance of the display element during the non-selection state of the display element.

During the detection frame time $T_2$, sequential addressing of the row electrodes 24 is performed, in a similar manner to that described above for the display frame $T_1$. However, during the frame time $T_2$, selection of a particular row electrode results in that row electrode being connected through a low value of resistance to a predetermined potential, as indicated by the letter L. When a row electrode is in the non-selected condition, it is held in an isolated, i.e. floating, condition, as indicated by the letter F. Selection of the row electrodes $Y_1 \ldots Y_m$ is performed during successive frame sub-intervals $t_1', t_2', \ldots t_m'$, which may be equal in duration to the frame sub-intervals of the display frame $T_1$, or may be of different duration. During the light detection frame time $T_2$, the column drive and detection circuit 28 shown in FIG. 3 is held in a light detection mode of operation, to receive light detection signals from the column electrodes 22 as described hereinafter. When light input is applied to any of the photoelectric elements, these become conductive, so that a virtual short-circuit condition is established at the corresponding intersections of row and column electrodes. Thus, if for example light is applied to photoelectric element $P_{11}$ shown in FIG. 2, then while row electrode $Y_1$ is in the selected state, i.e. is coupled to some predetermined value of potential through a low resistance value, column electrode $X_1$ will also be connected to this potential, due to the conductive state of photoelectric element $P_{11}$. This state of the column electrode is discriminated by the column drive and detection circuit 28, as described hereinafter.

From the above, it can be understood how, with the first embodiment of the present invention shown in FIGS. 1 to 3, it is possible to utilize the same row and column electrodes for both display drive and for light signal detection purposed, by dividing a basic frame interval into a display interval and a light detection interval.

In this embodiment, N-channel field-effect transistors (FETs) are used as switching elements. The H potential level is +5 V, while the O potential is zero V, the L potential is −5 V, while the F state represent connection to a potential of 0 V through a high impedance. With these values for the L and F states during the light detection frame time, there is no danger of switching elements being accidentally set in the conducting condition during that frame time, and therefore no danger of data stored in the display elements being destroyed. The basic frame time T is set at 40 ms, for this embodiment, which is sufficiently short to prevent any flickering of the display.

It should be noted that, although the frame times $T_1$ and $T_2$ are shown as being equal, in FIG. 4, it is not essential that they be the same. During the display frame $T_1$, it is necessary to make the frame sub-intervals of sufficient duration to discharge the capacitance of a display element in response to the display data signal. However, this consideration does not apply to the light detection frame time $T_2$, so that the latter can be made substantially shorter than the display frame $T_1$. In this embodiment, the gate electrodes of the switching elements $P_{ij}$ are held in a floating condition during the light detection frame, and as a result, it is possible that the gate electrode potentials may fluctuate somewhat during the light detection frame time $T_2$ by a sufficient amount to cause deterioration of the display. However this danger can be reduced by making $T_2$ substantially shorter than the display frame time $T_1$.

With this embodiment, the light source which is used to input data to the optoelectric elements, i.e. means such as a light pen, can be continuous in nature. In other words, it is not necessary to modulate this light source in synchronism with the switching signals of the display panel, so that it is unnecessary to provide any electrical connection between the light source and the display panel circuitry. However, it should be noted that, during the display frame, some leakage current will flow between the row electrodes and the column electrodes at intersections of these electrodes where a photoelectric element is illuminated by the external light source. The effects of this leakage current can be made negligible by suitable choice of the output impedance levels of the row and column electrode drive circuits, although this may result in some increase in overall power dissipation. This difficulty can be avoided if it is permissible to electrically connect the light pen or other light source to the display panel circuitry, and to synchronize the operation of the light source such that it is only turned on during the light detection frame $T_2$. If this is done, then there will be no flow of leakage current during frame time $T_1$ caused by the light source.

Figure 5:
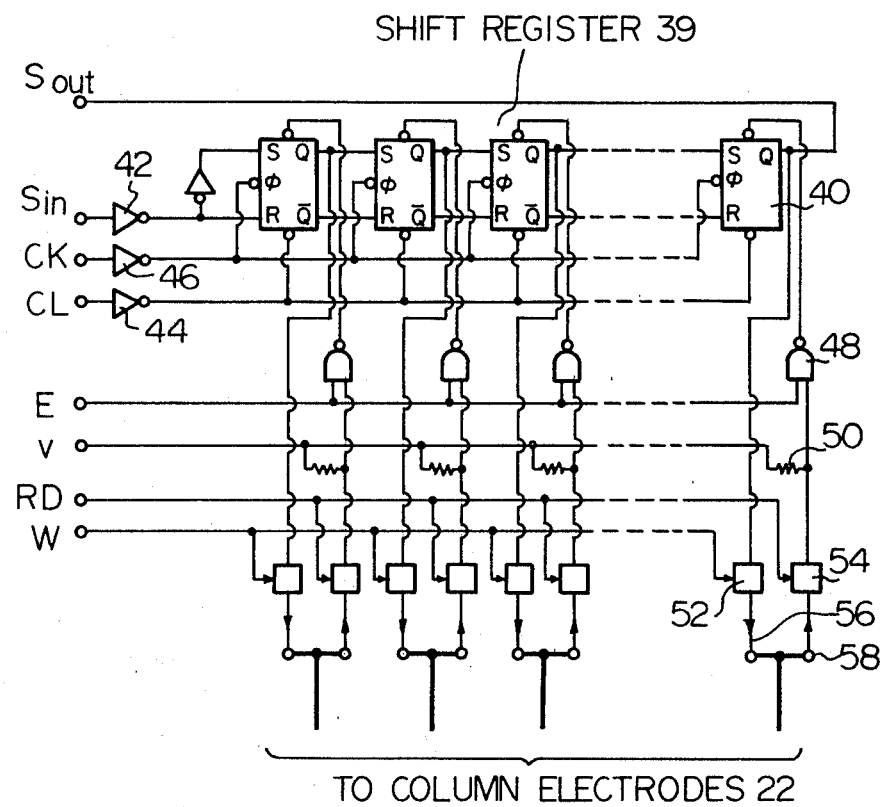
FIG. 5 is an embodiment of a column electrode drive circuit for a display panel according to the present invention.

Referring now to FIG. 5, a circuit diagram is shown therein of an example of column electrode drive and detection circuit 28 shown in FIG. 3. It should be noted that the data which is read out of and written into a displaypanel according to the present invention can have a plurality of potential levels, or can be of a continuously varying nature (i.e. analog data). However in this embodiment it will be assumed that the data has only two levels, i.e. binary data. For the case of binary data readout and write-in, it becomes possible to use a single shift register to perform parallel-to-serial and serial-to-parallel conversion for both the write-in and readout processes, thereby enabling the overall structure of the column electrode drive and detection circuit to be simplified. In FIG. 5, such a shift register is denoted by numeral 39, and comprises a plurality of flip-flop stages such as that denoted by numeral 40. Display data is sent in serial form from the data processing circuit 34 shown in FIG. 3, as denoted by $S_{in}$. The light detection data is sent in serial form to the data processing circuit 34, after parallel-to-serial conversion by shift register 39, and is denoted as $S_{out}$. A clock signal input is applied to the clock terminals of the shift register flip-flops, and the frequency of this clock signal determines the durations of the frame sub-intervals shown in FIG. 4. A shift register clear input signal is denoted as CL, and a Present Enable signal input is designated as E. Buffer inverters are provided at these signal inputs, as denoted by numerals 42, 44 and 46. During the display frame time $T_1$, display data is input to shift register 39, and is stored therein in parallel form. This display data is applied to column electrodes 22 through a set of switching elements, a typical one of which is denoted by numeral 52. These switching elements can comprise, transistors, transmission gates, or other suitable devices. These switching elements are controlled by a write-in signal W, to enter the conducting condition during the display frame time $T_1$, thereby transferring the display data in parallel form, one row at a time, to the column electrodes 22.

During the light detection frame $T_2$, another set of switching elements, a typical one of which is denoted by numeral 54, are set in the conducting condition in response to a read signal RD. The output of switching element 54 is applied to one input of a NAND gate 48, while the Preset Enable signal E is applied to the other input of NAND gate 48. The output of NAND gate 48 is coupled to the data input terminal of FF 40. The output side of switching element 54 is connected through a resistor 50 to a fixed potential v. It can be understood that the potential applied to the input of NAND gate 54 which is coupled to switch 54 will be determined by the impedance of the photorlectric element which is currently being selected by the row drive signal, i.e. the photoelectric element at the intersection of the column electrode connected to switch 54 and the row electrode which is currently coupled to the L potential. In other words, there will be a voltage division performed as a result of this photoelectric element impedance, so that the amount of light which is illuminating that photoelectric element will determine the potential which is applied to the input of NAND gate 48 coupled to resistor 50. If this potential is sufficiently below some predetermined level (i.e. the input threshold voltage level of NAND gate 48), then the output of NAND gate 48 will go to a low logic level potential, while if the potential read out from the photoelectric element is above this threshold level, the output of NAND gate 48 will be at a high logic level potential. NAND gate 48 therefore serves to discriminate whether the amount of light which is illuminating a currently selected photoelectric element is above or below a predetermined threshold. The outputs from the set of NAND gates such as NAND gate 48 therefore constitute the light signal detection data, which is stored into shift register 39 in parallel form, one row of optoelectric elements at a time, and is sent out in serial form, during each of the frame sub-intervals $t_1', t_2', \ldots$ which are shown in FIG. 4, during the light detection frame $T_2$. The serial detection data is sent, as signal $S_{out}$, to the data processing circuit 34, and from there is stored in the memory 36.

As stated hereinabove, the present invention is not limited to liquid crystal display panels which handle only two-level data, but can also be used for display panels in which either the write-in data (for display) or the readout data (from light detection), or both of these, is multi-level data, or continuously varying (i.e. analog) data. In such a case, a separate shift register can be provided for each column of display elements, together with sample-and-hold circuits and amplifier circuits.

Figure 6:
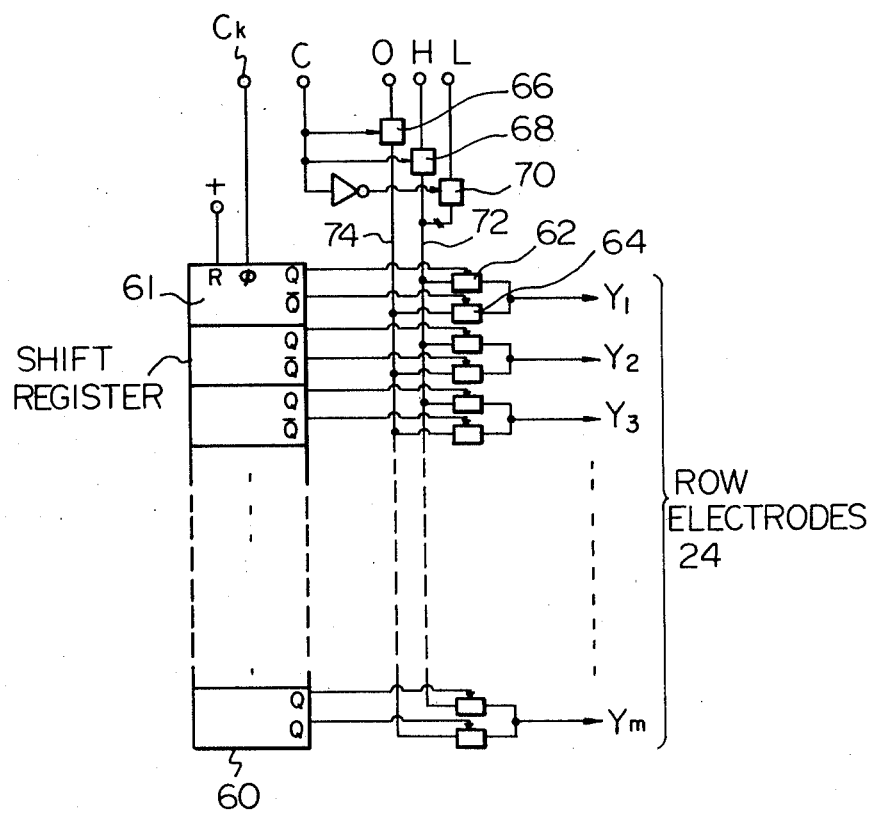
FIG. 6 is an embodiment of a row drive circuit for a display panel according to the present invention.

FIG. 6 is an example of a row electrode drive circuit for the first embodiment of the present invention, corresponding to the circuit block 30 of FIG. 3. Sequential addressing of the row electrodes, on a one-at-time basis is performed by means of a shift register 60, in response to clock signal Ck. The frequency of clock signal Ck may be made either identical, during the display and light detection frame intervals $T_1$ and $T_2$, or may be made higher during the $T_2$ frame interval if the latter is to be made shorter than $T_1$ for the reasons discussed hereinabove. During shifting operation by shift register 60, the Q output of each of the flip-flops of the shift register, such as flip-flop 61, goes successivel from a low logic level to remain at a high logic level for the duration of one of the frame sub-intervals $t_1, t_2 \ldots t_n$ shown in FIG. 4. While the Q output is at the high logic level, a transmission gate such as that denoted by numeral 62 is enabled to connect a line 72 to the corresponding row electrode. At all other times, each row electrode is connected to another line 74. Numerals 66 and 68 denote transmission gates which are controlled by mode selection signal C to couple a low potential 0 and a high potential H respectively to lines 74 and 72. Another transmission gate 70 is responsive to the inverse of mode selection signal C for connecting line 72 to a low (i.e. negative) potential L. During the display frame time $T_1$, the line 72 is held at the H potential, while line 74 is held at the 0 potential. During the detection frame time $T_2$, line 72 is held at the L potential, while line 74 is held in a floating condition. In this way, the row electrode drive conditions which have been described hereinabove with respect to FIG. 4 are successively produced during the display and light detection frame times $T_1$ and $T_2$.

Figure 7:
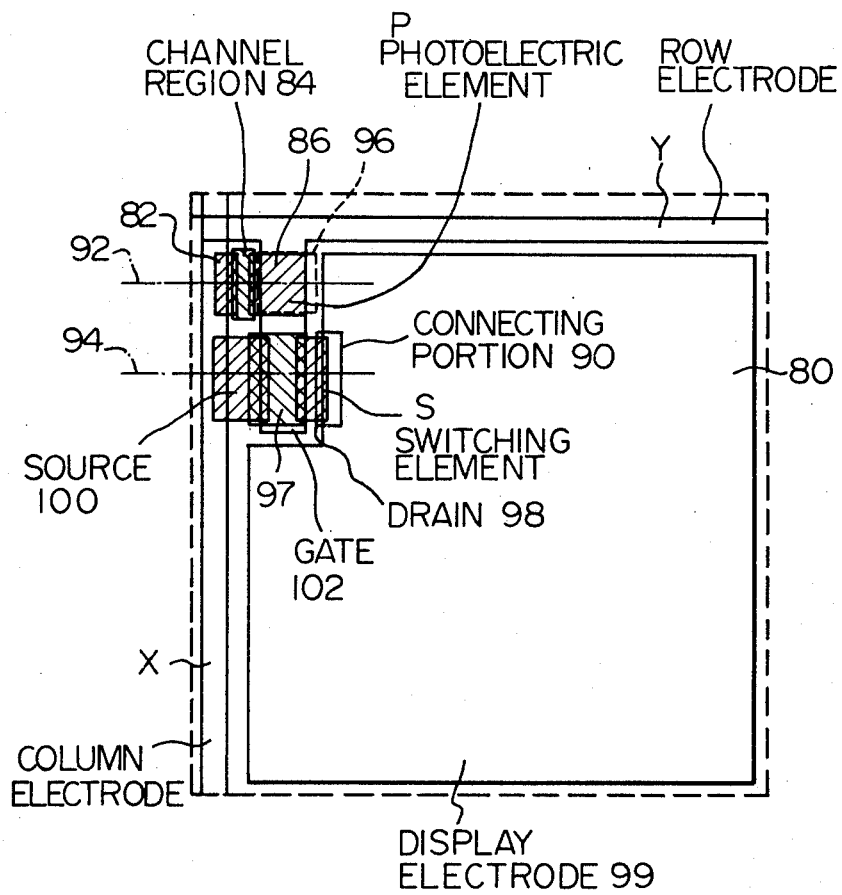
FIG. 7, FIGS. 8A and 8B, and FIGS. 9A to 9F are diagrams illustrating the method of constructing the switching and photoelectric elements upon an embodiment of a liquid crystal display panel according to the present invention.
Figure 8A:
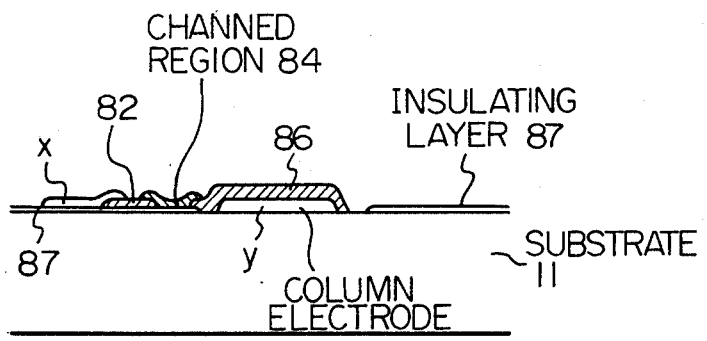
Figure 8B:
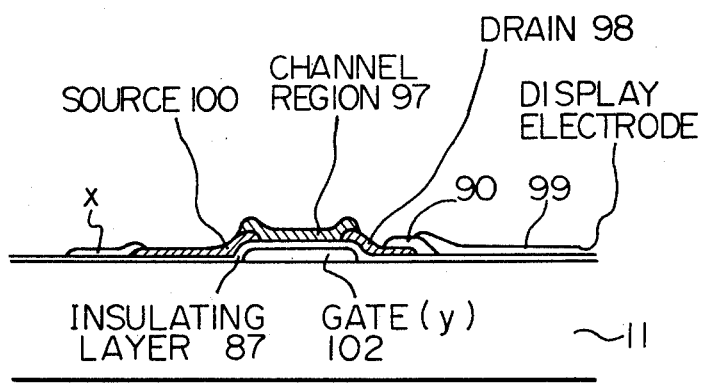

FIG. 7, together with FIG. 8A and FIG. 8B show the physical configuration of one of the photoelectric elements, denoted as P (i.e. one of the set of elements shown as $P_{ij}$ in FIG. 2) and one of the switching elements, denoted as S (i.e. corresponding to one of the set of switching elements shown as $S_{ij}$ in FIG. 2), for the first embodiment of the present invention described above. Row and column electrodes at whose intersection this photoelectric element and switching element are positioned are denoted simply as X and Y respectively. FIG. 7 is a partially cross-sectional view through the display element corresponding to elements S and P, while FIGS. 8A and 8B show cross-sectional views taken through planes denoted by numerals 92 and 94 in FIG. 7, respectively, i.e. through the optoelectric element P and the switching element S, respectively. In this embodiment, each of the photoelectric elements comprises a pair of PN junctions, connected back-to-back, i.e. in opposition to one another, to form a kind of photo-transistor without a gate electrode, of PNP or NPN configuration. Such a device has a good switching response with respect to light which impinges upon at least one of the PN junctions. Either a planar or a laminated type of construction can be used for these photoelectric elements, and in this embodiment a planar construction is used, as can be seen from FIG. 8A. If it is assumed that a PNP configuration is adopted, then numeral 86 in FIG. 8A denotes a layer of P-type semiconductor which is in contact with the row electrode Y, numeral 82 denotes a layer of P-type semiconductor which is in contact with the column electrode X, and numeral 84 denotes a layer of N-type semiconductor which forms junctions with layers 82 and 86. In this way, a simple but effective photoelectric element can be provided at each intersection of the row and column electrodes.

The construction of the switching elements S will now be discussed. In this embodiment, these element comprise thin-film insulated-gate field effect transistors (i.e. IG FETs). These IG FETs are formed, together with the photoelectric elements, upon a transparent substrate 11, which forms one of the two substrates of the display panel within which the liquid crystal is sandwiched. It is also possible to use a silicon substrate upon which to form the switching elements and photoelectric elements, however in this embodiment thin-film technology is used to form the elements upon a substrate made of a transparent material, such as glass. In FIG. 8B, numeral 102 denotes a conductive portion which forms the gate electrode of switching element S, and which in fact constitutes an area extending from the row electrode Y that is connected to the photoelectric element P, as can be understood from FIG. 7 and FIG. 8A. Gate electrode portion 102 is covered with an insulating film 87. A portion of semiconductor film formed over the insulating film 87 serves as the source electrode 100, which is electrically connected to the column electrode X. Another semiconductor region 98 serves as the drain electrode, and is coupled to a conductive portion 99 which connects to the display electrode. It is possible to connect the drain 98 directly to the display electrode portion 99, however in this embodiment contact is established through an intermediate metallic film portion 90, which provides certain manufacturing advantages.

Various types of semiconductors may be used to form the elements described above. These include group II to VI compounds of CdSe, CdS, etc., group III to V compounds of GaAs, InSb, etc, group IV to VI compounds of PbS, and so on, as well as single-element semiconductors such as Si, Ge, Te, etc. The switching and photoelectric elements may be formed with thin-film, monocrystalline, polycrystalline, amorphous materials, etc. In the case of thin-film elements, physical methods of forming these elements can comprise evaporative deposition, sputtering, ion plating, etc, or chemical techniques such as CVD, plasma discharge or other such methods can be used.

As can be understood from the preceding, the present invention is applicable to the use of a wide variety of materials and techniques for forming the switching and photoelectric elements of a liquid crystal display. Superior characteristics for these elements can however be obtained by some particular methods. One such method is to use an amorphous film of silicon, formed by a glow discharge technique, to provide the semiconductor portions.

Figure 9A:
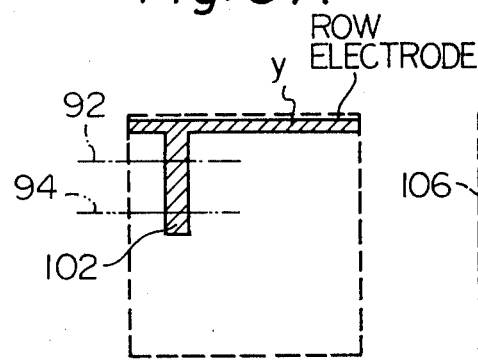
Figure 9B:
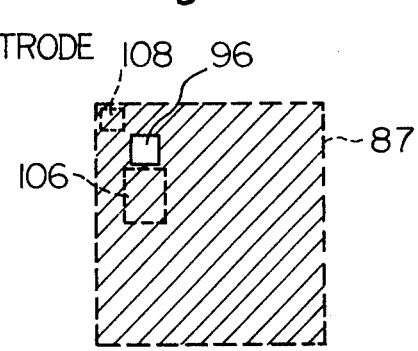

A specific method of manufacturing a display panel according to the first embodiment will now be described in detail. The substrate supporting the elements and electrodes comprises a suitable glass, such as Pyrex glass. The substrate is cleaned first, by washing with pure water, organic solvent, acid, alkali or other suitable agent. A protective film can then be formed upon the surface of the substrate, if desired. A metallic film is then formed upon the substrate, which will be used to constitute the row electrodes $Y_{ij}$ and the gate electrodes of the switching elements. Any suitable material such as gold, aluminum, chromium, etc can be used for this film, but in this embodiment a film of aluminum is formed by evaporative deposition in a vacuum. This film is then patterned by a photo-etching technique. The result of this patterning process, for the case of a single display element, is illustrated in FIG. 9A. The basic requirements for this insulating film are that it must cover the gate electrode of the switching element (i.e. region 106) and a region between the row and column electrodes (i.e. region 108), and that it must have an opening provided to enable the column electrode to be connected to the photoelectric element, as shown in FIG. 8A (i.e. region 96 in FIG. 9B). Region 96 is removed by photo-etching. It is important that the insulating film 87 should have good insulation properties, high stability, and a high degree of surface regularity. In this embodiment, a film of $SO_2$ is used, which is formed through high-temperature dissolution of $SiH_4$ in $O_2$.

Figure 9C:
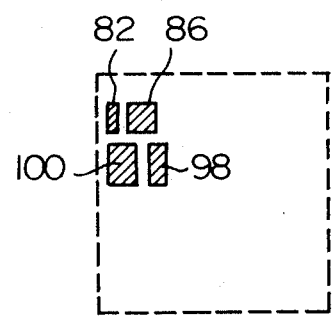

In the next stage, a film of semiconductor material is formed, as indicated in FIG. 9C, which shows this film after it has been patterned. This film should be such as not to form a rectifying junction where it contacts the metallic film 90 (shown in FIG. 8B), which is formed in a subsequent stage, and should have low resistance. In this embodiment, the semiconductor film of FIG. 9C consists of a film of N-type amorphous silicon to which hydrogen has been added. This is formed by glow-discharge dissolution of $SiH_4$ to which $PH_3$ has been added. It is however equally possible to use a monocrystalline or polycrystalline film for this purpose. Patterning of this film is performed to provide the source and drain electrode portions 98 and 100, as shown in FIG. 9C, as well as connecting portions 82 and 86 for the photoelectric element.

Figure 9D:
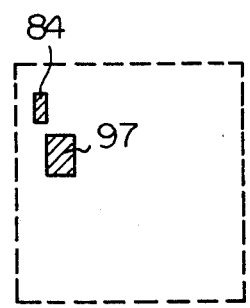

In the next stage, as indicated by FIG. 9D, semiconductor regions to serve as the channel portions of the switching element and optoelectric element are formed, as indicated by 97 and 84. In general, in will be preferable to make the type of semiconductor majority carrier in the latter portions opposite to the majority carriers of the semiconductor portions which are formed in the step of FIG. 9C. However it is also possible to use the same type of majority carriers in both sets of semiconductor regions, so long as the Fermi levels of each type of carrier are different. In this embodiment, the semiconductor regions of FIG. 9D comprise a film of amorphous silicon containing hydrogen, formed by glow-discharge dissolution of $SiH_4$ with $B_2H_6$ added to it. Patterning of this film is then performed by photo-etching.

Figure 9E:
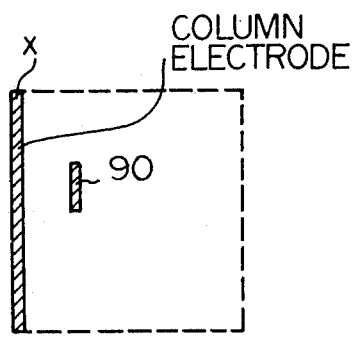
Figure 9F:
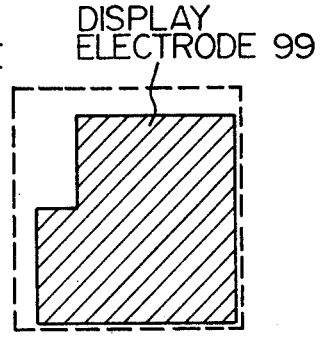

In the next stage, as shown in FIG. 9E, electrode connecting portion 90 is formed, to provide connection between the drain region 98 and the display electrode. In this embodiment, connecting portion 90 is formed by evaporative deposition of aluminum. A region of this film is also patterned to form a section of the column electrode, as indicated by the letter X.

In the final stage, the display electrode 99 is formed. In this embodiment, the liquid crystal display utilizes the twisted nematic mode (TN mode), so that it is necessary for the display electrodes to be transparent, and these are therefore formed of a film of $SnO_2$:Sb, or $In_2O_3$:Sn, by means of a high-frequency ion plating process.

A transparent protective film is then formed over all of the elements and electrodes, except in regions where external connections must be formed. A molecular alignment layer is then formed on the protective film, to establish the TN mode of operation of the liquid crystal.

Conventional types of thin-film transistor are formed by using polycrystalline semiconductor compounds such as CdS, CdSe, PbS, etc. However, with the present embodiment, an amorphous semiconductor is used consisting of amorphous silicon containing dangling bonds formed by terminators, comprising atoms of hydrogen, fluorine, or other suitable substance. One method of preparing such an amorphous semiconductor is to subject $SiH_4$ to glow discharge dissolution. However, it is also possible to use $SiF_4$ for this purpose. It has been found that glow discharge dissolution of $SiH_4$ or $SiF_4$ mixed with $H_2$ or Ar can facilitate the manufacturing process. However, glow discharge dissolution of $SiH_4$ alone will result in a film having improved characteristics. In addition to the glow discharge method of producing a film of amorphous silicon, it is also possible to produce a film having almost identical properties by performing sputtering of silicon in a gaseous plasma containing $H_2$ or $F_2$. As an alternative method, the reactive high-frequency ion plating method can be used to form such a silicon film. This method has the advantages of rapid formation of the amorphous film, and of easy control of the levels of $H_2$ or $F_2$ used in producing the film. With this ion plating method, silicon is evaporated by heating with an electron beam, and the film is formed by plasma discharge in a mixture of this silicon vapor with hydrogen, fluorine, $SiH_4$ and also, if necessary Ar may be added to the vapor/gas mixture. The plasma discharge is carried out in a high-frequency electric field. With the latter method, control of the addition of impurities can be provided by adding $PH_3$, $B_2H_6$, etc. in the vapor phase, thereby enabling PN junctions to be formed in the film at any desired positions. Such PN junctions can be used to provide high levels of OFF resistance for the switching elements, and as described hereinabove can also be used to form optoelectric elements. Use of such an amorphous silicon film, formed by a process which permits control of the addition of impurities whereby PN junctions are formed, is an extremely advantageous method of manufacturing the switching and photoelectric elements of a display panel according to the present invention. It can be understood that, since the photoelectric elements are formed during the same stages of manufacture in which the switching elements are formed, the production of a liquid crystal display panel according to the present invention involves no greater difficulty of manufacture than in the case of a display panel which contains only switching elements. This is particularly true, because of the fact that the switching elements and the photoelectricelements are simultaneously formed upon the same substrate, so that accurate alignment of the photoelectric elements with respect to the switching elements and various electrodes is assured.

Figure 10:
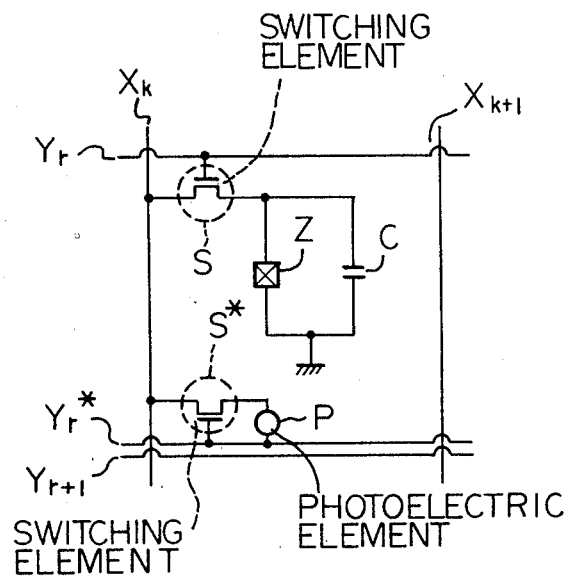
FIGS. 10, 11, 12 and 13 are equivalent circuit diagrams of single display elements for four other embodiments of display panels according to the present invention.

A second embodiment of the present invention will now be described. The method of forming the switching and photoelectric elements and electrodes of this embodiment can be similar to that described hereinabove with reference to FIGS. 7, 8A and 8B, and 9A to 9F. The only difference between this embodiment and the first embodiment is that a separate row electrode is provided to control each row of photoelectric elements in the second embodiment. For this reason, the second embodiment will only be described with reference to a single display element, as illustrated by the equivalent circuit diagram of FIG. 10. Here, $Y_r$ and $Y_{r+1}$ denote two typical row electrodes used to control switching elements such as element S, and correspond to the row electrodes $Y_1$, $Y_2$, . . . shown in FIG. 2 for the first embodiment. Similarly, $X_k$ and $X_{k+1}$ correspond to the column electrodes $X_1$, $X_2$ . . . of FIG. 2, and similarly serve to apply display data signals to the switching elements S and to read out light signal data from the photoelectric elements. However, in this second embodiment, separate row electrodes are used to control the gates of a separate set of switching elements which are coupled to each row of photoelectric elements, e.g. row electrode $Y_r^*$ which controls the gate electrode of switching element S*, coupled between a photoelectric element P and the column electrode $X_k$. During the display frame time $T_1$, a potential is applied to the row electrode $Y_r^*$ such that switching element S* is held in the non-conducting state. During the display frame time $T_1$, scanning signals are sequentially applied to the row electrodes $Y_r$, $Y_{r+1}$, . . . to write in display data to the display elements from the column electrodes in the same way as has been described for the first embodiment. During this display frame, any increase in the conductance of photoelectric element P, caused by application of a light pen etc. will have no effect upon the operation, since the photoelectric element is isolated from the column electrode $X_k$ by the switching element S*. Thus, with this second embodiment no leakage current can flow between the row and column electrodes due to light illuminating the photoelectric elements during the display frame time, as can occur with the first embodiment. During the light detection frame time $T_2$, a potential is applied to the row electrode $Y_r$ such that switching element S is made non-conductive, while scanning signals are sequentially applied to the row electrodes $Y_r^*$, $Y_{r+1}^*$ etc, such that the rows of switching elements controlled thereby are made sequentially conductive, in the same manner as has been described for the row electrodes of the first embodiment. In this way, readout of light signal data from the photoelectric elements S to the column electrodes is performed as in the first embodiment.

The second embodiment provides the advantages that, as stated above, leakage current cannot flow between the row and column electrodes during the display frame, even if the photoelectric elements are illuminated. In addition, a potential is applied to the gate electrodes of the switching elements S, controlling the display electrodes, such that these switching elements are held in the non-conducting state during the light detection frame $T_2$, rather than these gate electrodes being left in a floating condition as is done with the first embodiment. Thus, there is no danger of deterioration of the display as a result of fluctuations in the gate potentials of the switching elements S during the light detection frame time, with the second embodiment of FIG. 10. However, the advantages described above are obtained at the expense of some additional complexity of the display panel configuration and in the peripheral circuitry, since separate row electrodes $Y_r^*$ etc. must be provided, together with additional connecting leads for coupling these row electrodes to the peripheral circuitry.

Figure 11:
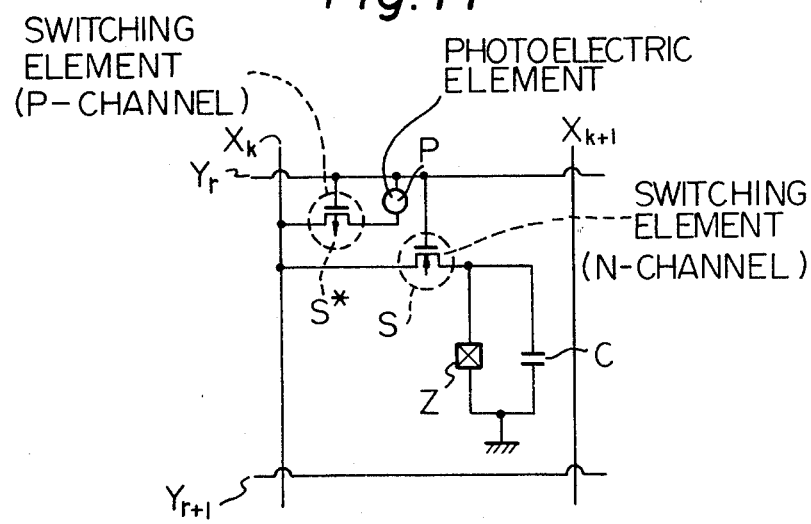

A third embodiment of a liquid crystal display panel according to the present invention will now be described. As for the second embodiment, the third embodiment will be described only with reference to the equivalent circuit diagram of a single display element. The method of manufacturing this embodiment can be similar to that described for the first embodiment above. In the third embodiment, as in the second embodiment, a separate switching element is provided to control each of the photoelectric elements P, as denoted by S* in FIG. 11. However, in this case, the type of semiconductor carrier (i.e either P-type or N-type) used in the switching element S* is opposite to that used in the switching element S which controls the display electrode signals. If we designate a particular gate electrode potential for which switching element S is in the conducting state and S* is non-conducting as H, and designate a gate potential for which element S is non-conducting while element S* is conducting as L, and moreover if we designate as 0 a gate electrode potential for which both switching elements S and S* are in the non-conducting state, then it can be understood that the scanning signals applied to the row electrodes $Y_r$, $Y_{r+1}$ can be generated as described for the first embodiment and described with reference to FIG. 4, with the difference that the potential levels H, O, and L and the floating condition F, are replaced by the potentials H, O, L and 0 respectively. It can be seen that the third embodiment provides the same advantages as described above for the second embodiment, i.e. elimination of the effects of leakage current through the photoelectric elements during the display frame $T_1$ and freedom from fluctuation of the gate electrode potential of elements S during the light detection frame $T_2$, but at the cost of some additional complexity of the manufacturing process.

Figure 12:
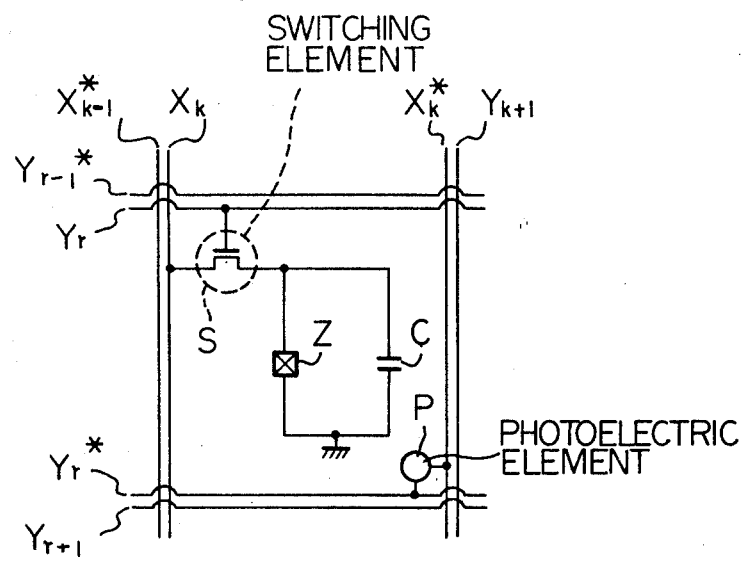

A fourth embodiment of the present invention will now be described, again with reference to an equivalent circuit diagram of a single display element of the display panel, as shown in FIG. 12. The important difference between this embodiment and the preceding embodiments is that a separate set of row and column electrodes are coupled to the photoelectric elements in order to read out light signal data. In FIG. 12, typical row and column electrodes for this purpose are designated as $X_k^*$ and $Y_r^*$, at whose intersection is connected a photoelectric element P. The row and column electrodes $X_k$, etc. and $Y_k$ etc. are used in the same manner as has been described for the preceding embodiments, to control the supply of display data signals to the display electrodes through switching elements S. In addition the photoelectric elements P are sequentially scanned, and light signal information read out from them over the column electrodes $X_k^*$ etc., in the same way as has been described for the first embodiment. With this fourth embodiment, it is not necessary to perform scanning of the display electrodes and the photoelectric elements during two separate frame times, as in the preceding embodiments, since the light signal detection and the display functions are completely separate. This embodiment provides the advantages described for the second and third embodiments, namely, freedom from the effects of photoelectric leakage current upon the display function, and from any fluctuations of the gate potentials of the switching elements which control the display electrodes.

Figure 13:
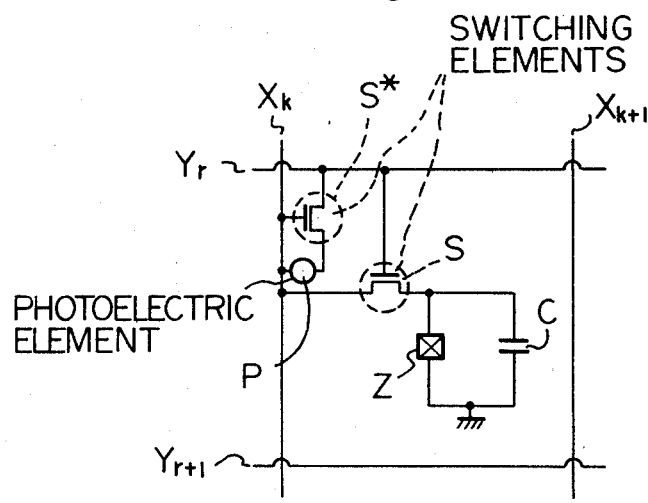

A fifth embodiment of the present invention is shown in FIG. 13, again with reference to the equivalent circuit diagram of a single display element. In this embodiment, an individual switching element S* is provided for each of the photoelectric elements P. However, in this case, the gate electrode of switching element S* is connected to the column electrode $X_k$ of that photoelectric element. During the light detection frame time $T_2$, all of the column electrodes $X_k$, $X_{k+1}$, . . . are held at a potential such that the switching elements S* are in the conducting state. The row electrodes $Y_r$, $Y_{r+1}$, etc are scanned sequentially in a similar way to that described for the first embodiment, and current which flows through a photoelectric element selected by the row scanning signal is detected as described for the first embodiment. If it is ensured that the potentials applied to the row electrodes during the display frame time $T_1$ do not exceed that level at which the switching elements S* begin to conduct, then the effects of leakage current through the photoelectric elements P during the display frame can be eliminated. In addition the switching elements S can be held at a gate electrode potential, during the light detection frame $T_2$, such that no variations of the display electrode potential occur during that frame time.

Figure 14A:
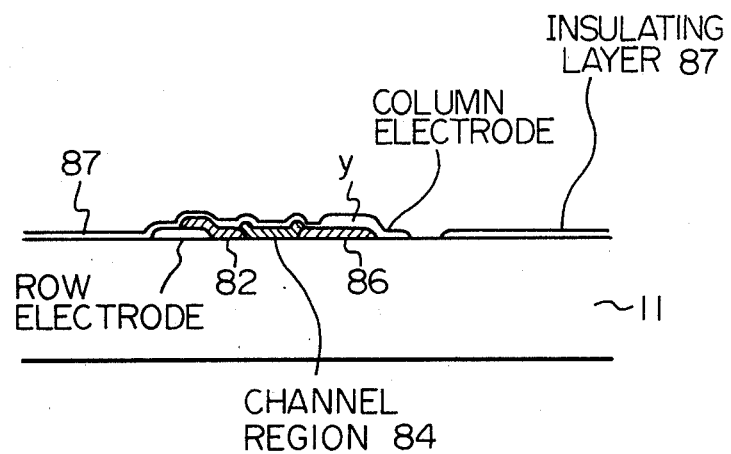
FIGS. 14A and 14B, and FIGS. 15A and 15B are cross-sectional diagrams illustrating the methods of forming switching and photoelectric elements upon two other embodiments of display panels according to the present invention.
Figure 14B:
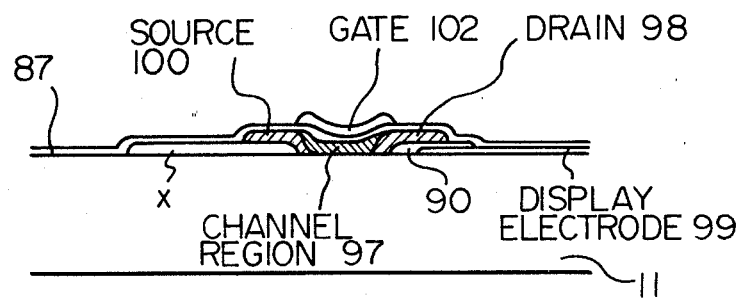

A sixth embodiment of a liquid crystal display panel according to the present invention will now be described, with reference to FIG. 14A, showing a cross-sectional view of a photoelectric element of this embodiment, and FIG. 14B showing a cross-sectional view through a switching element. This sixth embodiment differs from the first embodiment described hereinabove only with respect to the manner in which the switching and optoelectric elements are formed upon the display panel substrate, since the order in which these elements are formed upon the substrate is different from that of the first embodiment. In this sixth embodiment, the display electrode 99 is formed first on substrate 11, then column electrodes X and connecting region 55. Next, the source and drain regions 100 and 98, together with regions 51 and 53 of the photoelectric element, are formed. Next, the channel regions 84 and 97 are formed, and then an insulating film 87, is formed, which serves both for gate insulation and for insulation between the row and column electrodes. Finally, the row electrode Y, and the gate electrode 102 are formed. Thereafter, a passivation layer and a liquid crystal molecular alignment layer may be formed overall, if desired. One advantage provided by this embodiment is that the conductive layer forming the row electrodes Y and the gate electrodes 102, which is formed after the regions constituting the photoelectric element, can be shaped such as to mask the light reaching the photoelectric element junctions, to thereby provide greater control over the characteristics of the photoelectric elements with respect to light. Another advantage is that the insulating film 87 covers all of the semiconductor portions, and therefore can serve also as a passivation layer.

Figure 15A:
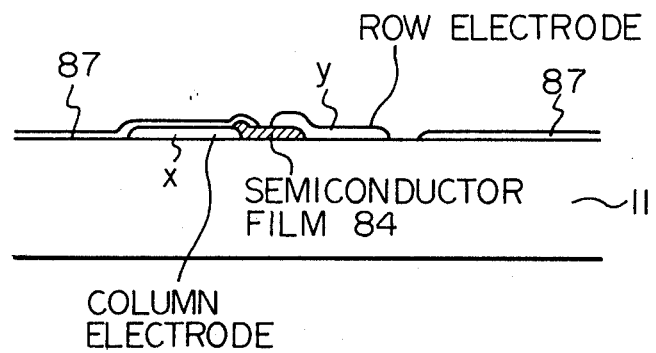
Figure 15B:
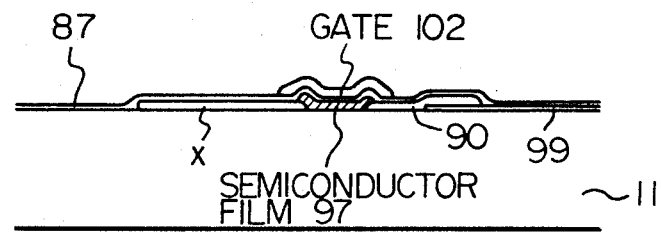

Another embodiment is illustrated in FIG. 15A, a cross-sectional view of a photoelectric element, and FIG. 15B, a cross-sectional view of a switching element. The difference between this embodiment and the fifth and sixth embodiments is that only a single type of semiconductor (i.e. either P-type or N-type) is used. The film regions comprising source 100 and drain 98, shown in FIGS. 7, 8B are not utilized in this embodiment, being replaced by a single semiconductor film, denoted by numerals 84 and 97 in FIGS. 15A and 15B. In FIGS. 15A and 15B, letters X and Y denoted metallic film regions forming part of the row and column electrodes respectively, while 99 denotes a metallic region connecting to the display electrode 99. Numeral 87 denotes an insulating film. With such an arrangement, it is possible to provide either ohmic contact or Schottky barrier junctions between the semiconductor film (97, 84) and the metallic regions X, Y and 90. In the case of ohmic contact being established, the photoelectric element of FIG. 15A must utilize the effect of variation of conductance of the semiconductor film 84 in response to light, in order to provide a light-detection capability. If on the other hand Schottky barrier junctions are established, then some of the characteristics of PN junctions can be provided thereby.

This seventh embodiment has the advantage that it is only necessary to form a single layer of semiconductor material, so that manufacture is simpler than for the preceding embodiments. In addition, since the OFF resistance of the photoelectric elements is less then for the other embodiments, various undesirable effects which can arise due to the creation of semiconductor carriers within the depletion layer can be reduced.

In the preceding embodiments, it has been assumed that the twisted nematic (TN) mode of operation of the liquid crystal panel is used. However, the present invention is equally applicable to display panels which utilize other modes including dynamic scattering, quest-host, birefringence, etc. In addition, the present invention is equally applicable to display cells of reflection type, transmission type, projection type, etc.

Various types of light source may be used to input light signal data, including a light pen, or a planar type of light source including a transparent plate upon which diagrams, characters etc. may be drawn.

In addition, in the described embodiments, it is assumed that both of the display panel substrates are transparent. However, it is equally possible to make at least one of the substrates non-transparent. For example, a silicon wafer can be used as a substrate, with the switching and photoelectric elements being formed directly from the silicon.

It is moreover assumed in the described embodiments that the peripheral circuitry and the display panel itself are separate units. However, it is equally possible to form all or part of the peripheral circuitry directly upon the display panel substrates.

In the first embodiment, the photoelectric elements comprise pairs of PN junctions, arranged back-to-back. However, it is also possible to use other types of photoelectric elements which do not include PN junctions, as is illustrated by the seventh embodiment described above. It is also possible to use single PN junctions, i.e. photo-diodes, as photoelectric elements. In general, any device whose conductivity varies in response to incident light can be used as a photoelectric element with the present invention.

From the above description of the preferred embodiments, it can be understood that a liquid crystal display panel constructed according to the present invention provides a number of significant advantages. Such a display panel enables data to be both displayed and to be written in, by convenient means such as a light pen which need not be connected to the display panel circuitry. Such a display panel can be easily and inexpensively manufactured, and can provide the same advantages of small size and light weight which are afforded by conventional types of liquid crystal display panel having only a display function. Display panels produced according to the present invention are widely applicable to such devices as electronic calculators, timepieces, miniature television receivers, computer peripheral devices, electronic games, etc.

It should be noted that various changes and modifications to the method described hereinabove may be made which fall within the scope claimed for the present invention. The appended claims are intended to cover all of the generic and specific features of the invention described herein.

What is claimed is:

1. A liquid crystal display device, comprising:
   means for generating a plurality of drive signals;
   at least two substrates;
   a layer of liquid crystal sandwiched between said substrates;
   a plurality of electrodes formed upon said substrates;
   a plurality of display elements controlled by said drive signals applied through said electrodes;
   a plurality of switching elements provided upon a first one of said substrates;
   a plurality of photoelectric elements provided upon said first one of said substrates; and
   means for detecting variations in characteristics of said photoelectric elements resulting from changes in levels of light impinging thereon.

2. A liquid crystal display device according to claim 1, wherein said photoelectric elements are arranged in the form of a matrix.

3. A liquid crystal display device according to claim 1, wherein said display elements are arranged in the form of a matrix.

4. A liquid crystal display device according to claim 1, wherein each of said display elements is controlled by a corresponding one of said switching elements.

5. A display device according to claim 1, wherein each of said switching elements and said photoelectric elements comprises at least one semiconductor portion, and wherein said semiconductor portion is of identical type in both said switching elements and in said photoelectric elements.

6. A display device according to claim 1, wherein each of said photoelectric elements comprises a rectifying element.

7. A display device according to claim 1, wherein each of said photoelectric elements comprises at least two rectifying elements, electrically connected in opposition to one another.

8. A display device according to claim 5, wherein said semiconductor comprises amorphous silicon which contains dangling bonds produced by terminators consisting of a substance which is a member of a group including hydrogen, fluorine and oxygen.

9. A display device according to claim 2, wherein changes in the characteristics of said photoelectric elements are read out over row electrodes and column electrodes coupled to said matrix array of photoelectric elements.

10. A display device according to claim 1, wherein said drive signal generation means and said photoelectric element characteristic detection means are operated in a time-sharing manner.

11. A display device according to claim 10, wherein said display elements are sequentially coupled to said drive signals during a first frame interval and wherein said photoelectric elements are sequentially coupled to said photoelectric detection means during a second frame interval, said first and second frame intervals being repeated in an alternating manner.

12. A display device according to claim 1, wherein at least a portion of each of said photoelectric elements is formed simultaneously with the formation of a portion of each of said switching elements during manufacture of said switching elements and said photoelectric elements upon said first substrate.

13. A display device according to claim 1, wherein each of said switching elements and said photoelectric elements comprises a plurality of thin film regions of conductive and semiconductive substances deposited successively upon said first substrate.

14. A display device according to claim 13, wherein predetermined ones of said thin film regions are arranged to be in electrical contact with conductive thin film regions constituting said plurality of electrodes.

15. A display device according to claim 1, wherein said switching elements comprise thin-film field-effect transistors.

* * * * *